United States Patent Office 3,337,592
Patented Aug. 22, 1967

3,337,592
SULFONAMIDE DERIVATIVES
Frances E. Knock, Glenview, Ill., assignor to E. R. Squibb & Sons, Inc., New York, N.Y., a corporation of Delaware
No Drawing. Filed Feb. 16, 1966, Ser. No. 527,763
9 Claims. (Cl. 260—397.7)

ABSTRACT OF THE DISCLOSURE

This invention relates to new sulfonamide derivatives and salts thereof which are antibacterial agents and also have tumor growth inhibitory activity. The new compounds have the formula

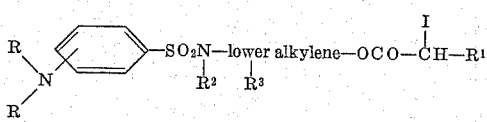

wherein R is hydrogen, lower alkyl, lower alkanoyl or phenyl-lower alkyl, $R^1$ is hydrogen or lower alkyl, $R^2$ is hydrogen, lower alkyl or the radical

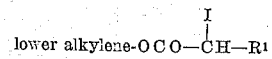

$R^3$ is hydrogen, lower alkyl or OCOCHRI.

---

This application is a continuation-in-part of application Ser. No. 395,911, filed Sept. 11, 1964, now abandoned.

This invention relates to new sulfonamide derivatives. More particularly, the invention relates to compounds of the formula

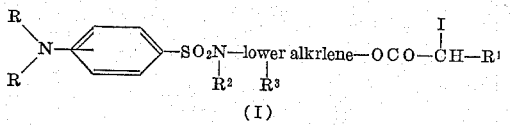
(I)

wherein R is hydrogen, lower alkyl, lower alkanoyl or phenyl-lower alkyl, $R^1$ is hydrogen or lower alkyl, $R^2$ is hydrogen, lower alkyl or the radical

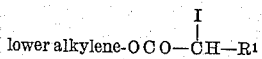

$R^3$ is hydrogen, lower alkyl or OCOCHRI, and to salts thereof.

In the formula the lower alkyl groups represented by the symbols R and the lower alkyl portion of the phenyl-lower alkyl group are straight or branched chain hydrocarbon radicals such as methyl, ethyl, propyl, isopropyl, butyl, isobutyl, t-butyl and the like. The lower alkylene groups are similar divalent saturated hydrocarbon chains. The lower alkanoyl groups are the acyl radicals of straight and branched chain lower fatty acids such as acetyl, propionyl, isopropionyl, butyryl and the like.

Any of the symbols R may be the same or different from one another.

The new compounds of this invention are derived from $N^4$-substituted sulfanilamido alkanols [JACS 61, 2342 (1939)] which are reacted with a halo-lower alkanoyl halide, in which the halogen is other than iodine and is preferably chlorine, in an inert organic solvent such as dioxane, at below room temperature, e.g., 0 to 15° C., then the terminal halogen is replaced with iodine by reaction with an excess of alkali metal iodine such as sodium iodide, in an inert organic solvent such as acetone at about room temperature. This procedure may be accomplished in one step by using an iodo-lower alkanoyl iodide or chloride or iodo-lower alkanoic acid with gaseous hydrogen chloride. If an $N^4$-unsubstituted product is desired, the $N^4$-nitrogen is protected and as a final step, the protective group is removed, e.g., by reduction.

The starting materials are obtained by reacting a p-substituted sulfanilyl chloride with the appropriate hydroxy-alkanolamine, e.g., ethanolamine, diethanolamine, N-methylethanolamine, N-ethylethanolamine, 3-amino-1, 2-propylene glycol, 2-amino-1,3-propanediol and the like, in the presence of an acid acceptor for hydrogen chloride such as pyridine or excess amine. If the symbols R represent hydrogen, the acetyl group is hydrolyzed (JACS, supra) or the p-nitrobenzenesulfonyl chloride is made to react with the appropriate amine and the nitro group is catalytically reduced.

The new compounds of this invention, when $R^2$ is hydrogen, form salts with basic substances such as alkali metal or alkaline earth metal hydroxides, e.g., alkali metal salts, particularly the sodium salt and alkaline earth metal salts such as calcium and magnesium. When a free amino group is present, they also form acid addition salts with organic and inorganic acids well known in this field. Especially useful are the hydrohalides, principally the hydrochloride and hydroiodide, as well as the sulfate, bisulfate, phosphate and p-toluene sulfonate.

The products of this invention are useful as antibacterial agents, e.g., to combat gram positive and gram negative organisms such as *Staphyloccus aureus, Salmonella schottmeulleri, Proteus vulgaris, Escherichia coli* and *Klebsiella pneumoniae*. They may be administered orally or parenterally in dosages of about 40 to 120 mg. in conventional forms. The sulfonamide derivative itself or a physiologically acceptable basic or acidic salt thereof is combined with a conventional pharmaceutical carrier, including excipient, lubricant, buffer, etc. according to accepted pharmaceutical practice. In this manner tablets, capsules, elixirs, injectables and the like for oral or parenteral use are provided.

The following examples are illustrative of the invention. Temperatures are expressed on the centigrade scale.

Example 1

Fifty grams of $N^4$-acetylsulfanilamidoethanol are dissolved in 450 ml. of dry dioxane in a three necked flask equipped with condenser, stirrer, thermometer and drying tube. The solution is cooled to just above the freezing point of the dioxane. Thirty grams of chloroacetyl chloride are added dropwise with stirring, keeping the temperature below 15°. A cloudy solution results which is stirred for two hours at room temperature, then permitted to stand overnight. An equal volume of distilled water is added. Charcoal is added and the mixture is filtered.

The filtrate is diluted with distilled water to incipient crystallization and then placed in the refrigerator for three hours. A voluminous white precipitate of $N^4$-acetylsulfanilamidoethyl chloroacetate forms which is separated by filtration and recrystallization from aqueous isopropanol.

Thirty-eight grams of the product thus obtained and 32 gm. of sodium iodide are dissolved in 200 ml. of acetone. The reaction mixture is stirred for one hour at room temperature in a flask protected from light. After standing overnight at room temperature, the precipitated sodium chloride is filtered off. An equal volume of water is added, then a solution of one mg./ml. of sodium bisulfite to decolorize. Distilled water is added to incipient crystallization (about 3.5 vol. of water at room temperature). The mixture is then placed in an ice bath for slow crystallization. The oily first precipitate is discarded and the white crystals of 2-($N^4$-acetylsulfanilamido)ethyl iodoacetate which then precipitate are filtered, dried and reprecipitated from acetone, M.P. 102–103°.

The sodium salt is formed by dissolving the product in the minimal quantity dilute sodium hydroxide solution and rapidly evaporating to dryness under high vacuum.

Example 2

By substituting N⁴,N⁴-dimethylsulfanilamido-α-methylethanol, M.P. 90–91°, for the N⁴-acetylsulfanilamidoethanol and α-chloropropionyl chloride for the chloroacetyl chloride in the procedure of Example 1, N⁴,N⁴-dimethylsulfanilamidoisopropyl α-chloropropionate and then N⁴,N⁴-dimethylsulfanilamidoisopropyl α-iodopropionate are obtained.

Example 3

By substituting N⁴-carbethoxysulfanilamidoethanol, M.P. 176°, for the N⁴-acetylsulfanilamidoethanol and otherwise proceeding as in Example 1, N⁴-carbethoxysulfanilamidoethyl chloroacetate and then the iodoacetate are obtained.

Example 4

By substituting N⁴-benzyl-N⁴-methylsulfanilamidoethanol, for the N⁴-acetylsulfanilamidoethanol and otherwise proceeding as in Example 1, N⁴-benzyl-N⁴-methylsulfanilamidoethyl chloroacetate and then the iodoacetate are obtained.

Example 5

By substituting N⁴-butyrylsulfanilamido-α,α-dimethylethanol, M.P. 166°, and α-chlorobutyryl chloride for the starting materials in Example 1, there are obtained N⁴ - butyrylsulfanilamido - α,α - dimethylethyl - α-chlorobutyrate and then the -α-iodobutyrate, respectively.

Example 6

2,2′-[(p-aminophenylsulfonyl)imino]diethanol is prepared as described in JACS 61, 2342 (1939). Seven grams of this compound is dissolved in 20 grams of dimethylformamide and saturated with gaseous HCl at 20° C. A solution of 6 grams of chloroacetic acid in 6 ml. of dioxane is added and the solution resaturated at 20° C. with gaseous HCl, then allowed to stand at room temperature for one week protected from air and light. The product is recovered by adding the solution dropwise to 500 ml. of absolute ether with good stirring. The ether is decanted from the very thick liquid, which for purification is dissolved in ethanol and reprecipitated from ether as before. The process is repeated three times. Protected from light, the product is dried in a vacuum desiccator over drying agent and sodium hydroxide pellets.

Three grams of the 2,2′-[(p-aminophenylsulfonyl)imino]diethanol, diester with chloroacetic acid, hydrochloride are dissolved in 15 ml. of ethanol, to which are added 3.0 g. of sodium iodide in 15 ml. of ethanol to give an immediate precipitate of sodium chloride. The reaction mixture is stirred one hour at room temperature, allowed to stand overnight at room temperature protected from light and air. The sodium chloride in quantitative yield is filtered off and the desired 2,2′-[(p-aminophenylsulfonyl)imino]diethanol, diester with iodoacetic acid hydroiodide is isolated by pouring its solution, with violent stirring, into 500 ml. ether. The tacky solid is dissolved in alcohol and precipitated from ether three times, finally dried in a vacuum desiccator over drying agent and sodium hydroxide.

Example 7

Following the procedure of Example 6 but substituting o - amino - N,N - bis(2-hydroxyethyl)benzenesulfonamide (obtained by reacting o-nitrophenylsulfonyl chloride with diethanolamine and reducing the reaction product with hydrogen in the presence of platinum oxide) for the 2,2′-[(p-aminophenylsulfonyl)imino]diethanol, there is obtained o - amino-bis[2(2-iodoacetoxy)ethyl]benzenesulfonamide hydroiodide.

Example 8

Following the procedure of Example 7 but utilizing m- or p-amino-N,N-bis(2-hydroxyethyl)benzenesulfonamide as starting material, m-amino-N,N-bis[2-(2-iodoacetoxy)ethyl]benzenesulfonamide hydroiodide and p-amino-N,N-bis[2-(2-iodoacetoxy)ethyl]benzenesulfonamide hydroiodide, respectively are obtained.

Example 9

Following the procedure of Example 6, but substituting p-amino-(2,3-dihydroxypropyl)benzenesulfonamide for the diethanolamine starting material in that example, there is obtained p-amino-N-[2,3-bis-iodoacetoxy)propyl]benzenesulfonamide, hydroiodide.

What is claimed is:

1. A member selected from the group consisting of a compound of the formula

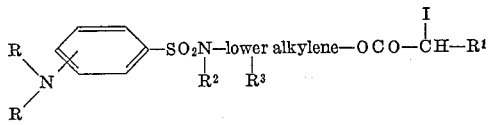

wherein R is a member of the group consisting of hydrogen, lower alkyl, lower alkanoyl and phenyl-lower alkyl, R¹ is a member of the group consisting of hydrogen and lower alkyl, R² is a member of the group consisting of hydrogen, lower alkyl and

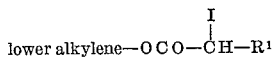

R³ is a member of the group consisting of hydrogen, lower alkyl and OCOCHRI, and a physiologically acceptable salt thereof.

2. A compound of claim 1 wherein one R is lower alkanoyl and the other R is hydrogen and R¹, R² and R³ are each hydrogen.

3. A compound as in claim 2 wherein the lower alkanoyl group is acetyl and the lower alkylene group is ethylene.

4. A compound as in claim 1 wherein each R is lower alkyl and R¹, R² and R³ are each hydrogen.

5. A compound as in claim 1 wherein one R is lower alkanoyl and the other R is hydrogen, R¹ is lower alkyl and R² and R³ are each hydrogen.

6. A compound as in claim 1 wherein each R, R¹ and R² are hydrogen and R³ is iodoacetoxy.

7. A compound of the formula

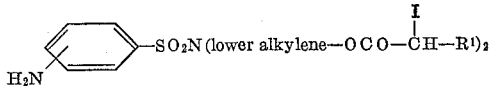

wherein R¹ is a member of the group consisting of hydrogen and lower alkyl.

8. A compound as in claim 7 wherein R¹ is hydrogen and the lower alkylene group is ethylene.

9. Physiologically acceptable acid addition salt a compound of claim 7.

No references cited.

WALTER A. MODANCE, *Primary Examiner.*

HARRY I. MOATZ, *Assistant Examiner.*